United States Patent
Brisebois et al.

(10) Patent No.: US 9,392,517 B2
(45) Date of Patent: *Jul. 12, 2016

(54) FACILITATION OF ADAPTIVE TRAFFIC FLOW MANAGEMENT BY A POWER-LIMITED MOBILE DEVICE

(71) Applicant: AT&T Mobility II LLC, Atlanta, GA (US)

(72) Inventors: Arthur Richard Brisebois, Cumming, GA (US); Richard J. Mountford, Millersville, MD (US); Haywood Peitzer, Randolph, NJ (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,472

(22) Filed: Apr. 14, 2015

(65) Prior Publication Data

US 2015/0223131 A1  Aug. 6, 2015

Related U.S. Application Data

(63) Continuation of application No. 13/682,325, filed on Nov. 20, 2012, now Pat. No. 9,031,559.

(51) Int. Cl.
| | | |
|---|---|---|
| *H04W 52/04* | (2009.01) | |
| *H04W 36/14* | (2009.01) | |
| *H04W 24/00* | (2009.01) | |
| *H04W 36/00* | (2009.01) | |
| H04W 36/24 | (2009.01) | |

(52) U.S. Cl.
CPC .............. *H04W 36/14* (2013.01); *H04W 24/00* (2013.01); *H04W 36/0083* (2013.01); *H04W 36/24* (2013.01)

(58) Field of Classification Search
CPC combination set(s) only.
See application file for complete search history.

(56) References Cited

U.S. PATENT DOCUMENTS

| | | | |
|---|---|---|---|
| 6,272,340 | B1 | 8/2001 | Wright et al. |
| 6,747,965 | B1 | 6/2004 | Nara et al. |
| 6,799,030 | B2 | 9/2004 | Barber et al. |
| 2002/0044666 | A1 | 4/2002 | Eran et al. |
| 2002/0045447 | A1 | 4/2002 | Rasanen |

(Continued)

OTHER PUBLICATIONS

Office Action dated Jun. 10, 2014 for U.S. Appl. No. 13/708,559, 29 pages.

(Continued)

*Primary Examiner* — Quan M Hua
(74) *Attorney, Agent, or Firm* — Amin, Turocy & Watson, LLP

(57) ABSTRACT

Facilitation of adaptive traffic flow management by a power-limited device during uplink-limited conditions is provided. A method can include: detecting that power emitted from the device satisfies a first defined condition; evaluating a defined characteristic of a network with which the device is associated and an application being executed by the device, wherein the evaluating is in response to the detecting; and determining whether to transmit information to the network to cause the device to be transferred by the network, wherein transferring is from a first wireless communication system to a second wireless communication system, and wherein the determining is performed based on the evaluating. In various embodiments, the first wireless communication system can be a long-term evolution system and the second wireless communication system can be a universal mobile telecommunications system.

20 Claims, 10 Drawing Sheets

(56) References Cited

U.S. PATENT DOCUMENTS

| | | | |
|---|---|---|---|
| 2003/0119503 | A1 | 6/2003 | Shohara et al. |
| 2005/0186923 | A1 | 8/2005 | Chen et al. |
| 2005/0288022 | A1 | 12/2005 | Ryu et al. |
| 2006/0073829 | A1* | 4/2006 | Cho et al. ............... 455/439 |
| 2007/0026795 | A1 | 2/2007 | de La Chapelle |
| 2007/0026861 | A1 | 2/2007 | Kuhn et al. |
| 2007/0177565 | A1 | 8/2007 | Lee |
| 2007/0248051 | A1 | 10/2007 | Nagaraj et al. |
| 2008/0063031 | A1 | 3/2008 | Kanter |
| 2008/0095092 | A1 | 4/2008 | Kim |
| 2008/0280615 | A1* | 11/2008 | Vinayakray-Jani ........... 455/437 |
| 2009/0047998 | A1 | 2/2009 | Alberth, Jr. |
| 2009/0170510 | A1* | 7/2009 | Kim .............. 455/434 |
| 2009/0305742 | A1 | 12/2009 | Caballero et al. |
| 2010/0246598 | A1 | 9/2010 | Bremer et al. |
| 2011/0158117 | A1 | 6/2011 | Ho et al. |
| 2012/0001841 | A1 | 1/2012 | Gokingco et al. |
| 2012/0071195 | A1 | 3/2012 | Chakraborty et al. |
| 2012/0147801 | A1 | 6/2012 | Ho et al. |
| 2012/0176923 | A1 | 7/2012 | Hsu et al. |
| 2012/0176979 | A1 | 7/2012 | Kim et al. |
| 2012/0184221 | A1 | 7/2012 | Jung et al. |
| 2012/0214422 | A1 | 8/2012 | Shi et al. |
| 2012/0218210 | A1 | 8/2012 | DeCaro et al. |
| 2014/0051449 | A1 | 2/2014 | Yerrabommanahalli et al. |

OTHER PUBLICATIONS

Office Action dated Aug. 14, 2014 for U.S. Appl. No. 13/682,325, 31 pages.
Office of Engineering and Technology, Cellular Telephone Specific Absorption Rate (SAR), http://www.fcc.gov/cgb/sar, Jun. 25, 2012, Last accessed Feb. 21, 2013.
Specific Absorption Rate, http://en.wikipedia.org/wiki/Specific_absorption_rate, Oct. 2, 2012, Last accessed Feb. 21, 2013.
Office of Engineering and Technology, Radio Frequency Safety, http://transition.fcc.gov/oet/rfsafety/sar.html, Jun. 25, 2012, Last accessed Feb. 21, 2013.
Office Action dated Oct. 21, 2013 for U.S. Appl. No. 13/708,559, 25 pages.
Notice of Allowance dated Jan. 15, 2015 for U.S. Appl. No. 13/682,325, 22 pages.
Office Action dated Apr. 29, 2015 for U.S. Appl. No. 13/686,871, 35 pages.
Office Action dated Aug. 25, 2015 for U.S. Appl. No. 13/686,871, 23 Pages.
Office Action dated Aug. 28, 2015 for U.S. Appl. No. 14/703,470, 26 Pages.
Office Action dated Dec. 30, 2015 for U.S. Appl. No. 13/686,871, 33 pages.

* cited by examiner

FACILITATION OF ADAPTIVE TRAFFIC FLOW MANAGEMENT BY A POWER-LIMITED MOBILE DEVICE

RELATED APPLICATION

This application is a continuation of, and claims the benefit of priority to, U.S. patent application Ser. No. 13/682,325 (now U.S. Pat. No. 9,031,559), filed on Nov. 20, 2012, and titled "FACILITATION OF ADAPTIVE TRAFFIC FLOW MANAGEMENT BY A POWER-LIMITED MOBILE DEVICE," the entirety of which application is hereby incorporated herein by reference.

TECHNICAL FIELD

The subject disclosure relates to wireless communications and, also generally, to various embodiments that facilitate adaptive traffic flow management by a power-limited mobile device.

BACKGROUND

Uplink reception at a base station (BS) device is important for a number of reasons including, but not limited to, transmission of data from the mobile device to another destination, signaling and call setup/maintenance functions impacting both uplink and downlink paths. For example radio link access, quality feedback, transmission control protocol and flow control feedback, failure timers and handover can all be dependent upon uplink reception at the BS device, even in cases in which the majority of content is transmitted and/or received over the downlink. Additionally, inadequate uplink reception calls can drop (even in cases in which the downlink is ideal). Impacts on call setup accessibility, in particular, and uplink transmission, in general, can be worsened if devices transmitting on the uplink operate in a power-limited mode.

DETAILED DESCRIPTION

Figure 1:
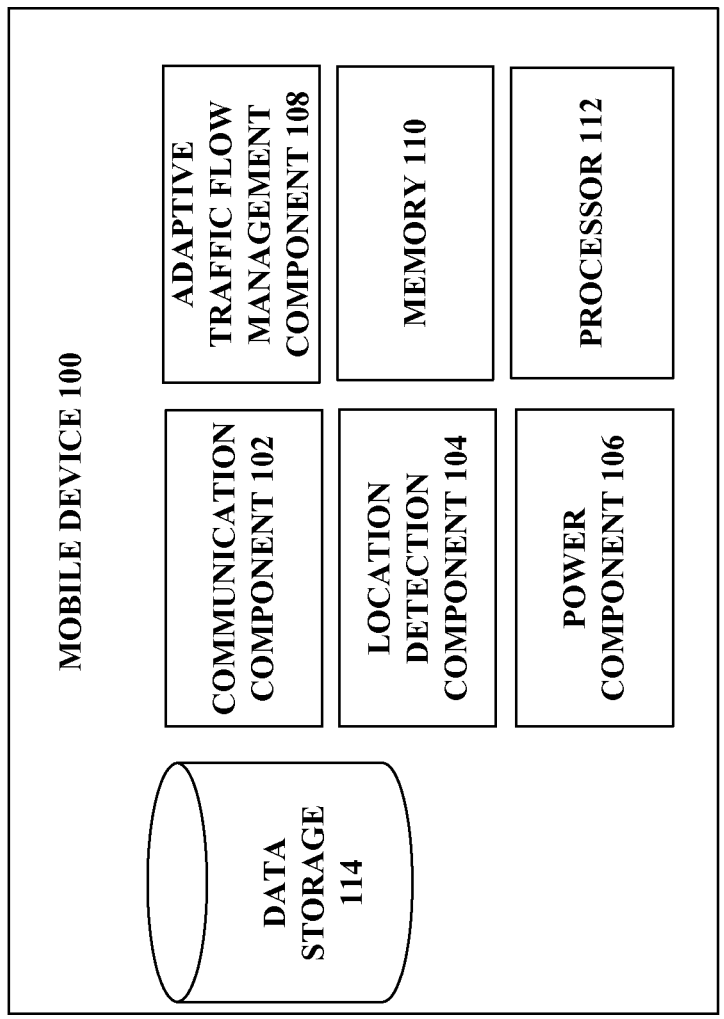
FIG. 1 illustrates an example block diagram of a mobile device that can be power-limited and can facilitate adaptive traffic flow management in accordance with embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS device)," "Node B," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "mobile device," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication system, including, but not limited to, Wireless Fidelity (Wi-Fi), Global System for Mobile Communications (GSM), Universal Mobile Telecommunications System (UMTS), Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), Zigbee and other 802.XX wireless technologies and/or legacy telecommunication technologies. Further, the term "femto" and "femtocell" are used interchangeably, and the terms "macro" and "macrocell" are used interchangeably.

Mobile devices can transmit and receive radio signals to support bi-directional wireless services. As the transmit power and receive sensitivity for the mobile device increase, wireless range and performance generally increase. However, radiation correspondingly increases.

Because the mobile device is possibly within proximity to a body of human form, e.g., a human body (whether the user of the device or a passerby within proximity of the mobile device), the mobile device can output only a limited amount of radiation in various scenarios. In particular, radiation emitted from mobile devices for transmission of information on the uplink is limited to levels deemed safe for absorption by the human body as determined by various governmental bodies.

A specific absorption rate (SAR) is the relative amount of radio frequency (RF) energy absorbed in the body of a user of a wireless device. The SAR depends upon a number of factors including, but not limited to, the geometry of the body part exposed to the RF energy, the geometry and location of the wireless device relative to the body part exposed to the RF energy, the amount of power emitted from the wireless device and the frequency-specific transmission loss between the wireless device and the body part. A SAR limit for public exposure from cellular telephones has been determined by the Federal Communications Commission (FCC) to be equal to or less than 1.6 watts per kilogram (1.6 W/kg) taken over a volume containing a mass of 1 gram of tissue.

Device manufacturers can seek to achieve a balance between wireless performance and meeting the requirements of the FCC. As such, rather than limiting wireless device power and performance to a single, worst-case level and sacrificing wireless performance at all times, wireless device manufacturers can employ one or more proximity sensors and configure the wireless devices to transmit power at different levels based on the proximity of the mobile device to a particular portion of the body.

However beneficial the reduction in power from a safety perspective, the performance impact is undeniable. Power reduction can expose limitations in downlink-centric layer selection mechanisms because the effective service area for any bi-directional wireless technology is only as good as the weakest channel (whether uplink or downlink).

Typically handover can be employed for downlink-centric limitations. Selection towards or away from a wireless communication system is generally triggered when raw downlink signal strength meets some absolute or relative criterion. When mobile device power is full, the uplink service area is roughly equivalent to downlink, so this method is effective in downlink-limited scenarios.

However, when mobile device transmit power is reduced, downlink-only selection methods amplify the negative performance effects of mobile device power reduction. And, according to current implementations of various systems, the radio network can be completely unaware of the mobile device power reduction. In this case bi-directional calls may drop when uplink limits are reached. Measurement-based mobility methods can also fail if the mobile device power is reduced as the measurement reports are not likely to be received by the BS device.

Adaptive traffic flow management by a power-limited mobile device can facilitate autonomous management of uplink communications to preserve call integrity at or near the edge of a cell. In particular, mobile devices can control their uplink communications based upon power limitation characteristics that may be unknown to the network.

Specifically, in one or more embodiments, a method can include: detecting, at a device comprising a processor, that power emitted from the device satisfies a first defined condition; evaluating, by the device, a defined characteristic of a network with which the device is associated and an application being executed by the device, wherein the evaluating is in response to the detecting; and determining, by the device, whether to transmit information to the network to cause the device to be transferred by the network, wherein transferring is from a first wireless communication system to a second wireless communication system, and wherein the determining is performed based on the evaluating.

As used herein, a "wireless communication system" means a frequency layer or system on which a mobile device can communicate and can include or be associated with any of the wireless communication technologies listed herein including, but not limited to, the LTE and UMTS technologies.

In one or more embodiments, a computer-readable storage medium can store computer-executable instructions that, in response to execution, cause a system comprising a processor to perform operations. The operations can include: evaluating whether a defined characteristic of a network with which the system is associated and a defined characteristic of an application executed by the system meets a first defined condition; determining to forego performing an action to cause the system to be transferred from a first wireless communication system to a second wireless communication system based on the defined characteristic of the network and the defined characteristic of the application meeting the first defined condition; and performing selective bundling of information to be transmitted from the system, wherein the performing is based on the determining.

As used herein, "selective bundling" and "selectively bundling," can mean temporarily bundling and storing information to be transmitted from the mobile device at the mobile device in lieu of transmitting the information from the mobile device. The embodiments described herein can perform selective bundling based on a determination that the application being executed by the mobile device is a non-real-time application and can therefore experience the delay that results from selective bundling and, in some cases, based on a determination that the uplink-limited network condition is likely to resolve (or has resolved) within an acceptable amount of time after the uplink-limited network condition has been discovered.

During selective bundling, the mobile device can be changed to the idle mode. After determining that the mobile device should be re-started (based on a satisfactory improvement in the uplink network condition), the mobile device can change to the active mode and transmit the bundled information as a burst of information.

In one or more embodiments, a system can include a memory to store computer-executable instructions, and a processor, communicatively coupled to the memory, that facilitates execution of computer-executable instructions to perform operations comprising: detecting a limitation of a defined characteristic of a network with which the system is associated, wherein the defined characteristic is related to uplink transmission from the system; ceasing transmission of information to be transmitted from the system, and performing selective bundling of the information, wherein the ceasing and the performing are based on the detecting; and re-starting transmission of bundled information from the system based on detecting a non-existence of the limitation of the defined characteristic.

Turning now to FIG. 1, an example block diagram of a mobile device 100 that can be power-limited and can facilitate adaptive traffic flow management in accordance with embodiments described herein is shown. The mobile device 100 can include a communication component 102, location detection component 104, power component 106, adaptive traffic flow management component 108, memory 110, processor 112 and/or data storage 114. In various embodiments, one or more of the communication component 102, location detection component 104, power component 106, adaptive traffic flow management component 108, memory 110, processor 112 and/or data storage 114 can be electrically and/or communicatively coupled to one another to perform one or more functions of the mobile device 100.

The mobile device 100 can be any number of different wireless mobile devices including, but not limited to, a cellular telephone, a tablet, a laptop, a personal digital assistant (PDA) or the like. In various scenarios, the mobile device 100 can limit output power based on proximity of the mobile device 100 to a human body (or region thereof). Further, the mobile device 100 can employ adaptive traffic flow management methods described herein to autonomously control uplink communications to increase the likelihood of preserving call integrity for the mobile device 100 at or near the edge of a cellular coverage area in which the mobile device 100 is located. In these embodiments, the output power of the mobile device 100 can be unknown to the network to which the mobile device 100 is communicatively coupled.

As shown, the mobile device 100 can include a communication component 102 that can be communicatively coupled to a network including a BS device. The communication component 102 can transmit information to and/or receive information from one or more other mobile devices and/or the network. The information can include, but not limited to, call setup requests, uplink and downlink signaling and communications, information indicative of a power level emitted by the mobile device 100 for uplink transmissions, voice call information, data information, video information or the like.

The location detection component 104 can include one or more proximity sensors (not shown) and can be configured to receive information from the proximity sensors and determine a location of the mobile device 100 relative to a portion of the body.

For example, in one embodiment, the proximity sensors can determine whether the mobile device 100 is located within a defined proximity to a human body (as, in some embodiments, the proximity sensors can determine that the mobile device 100 is not within a defined proximity to a human body). In various embodiments, the human body can be the user of the mobile device 100 or a nearby passerby.

As another example, the proximity sensors can determine a region at which the mobile device 100 is located. The region can be any of a number of different regions, including, but not limited to, the head, torso, lap or legs. Different regions of the body can be associated with different SARs and different corresponding maximum output power values for the mobile device.

In some embodiments, the one or more proximity sensors can output a signal when the proximity to the body is detected. In various embodiments, the type, frequency and/or strength of the signal can indicate the region of the body detected.

The power level component 106 can receive the signal output from the location detection component 104 and can adjust the level of power emitted by the mobile device 100 based on the region of the body at which the mobile device 100 is placed and based on the SAR requirement for the region of the body.

Figure 2:
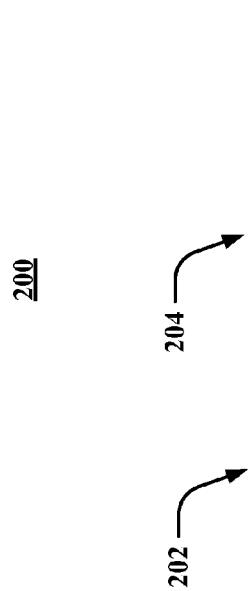
FIG. 2 illustrates an example mobile device power attenuation table of a mobile device that can facilitate adaptive traffic flow management in accordance with embodiments described herein.
Figure 4:
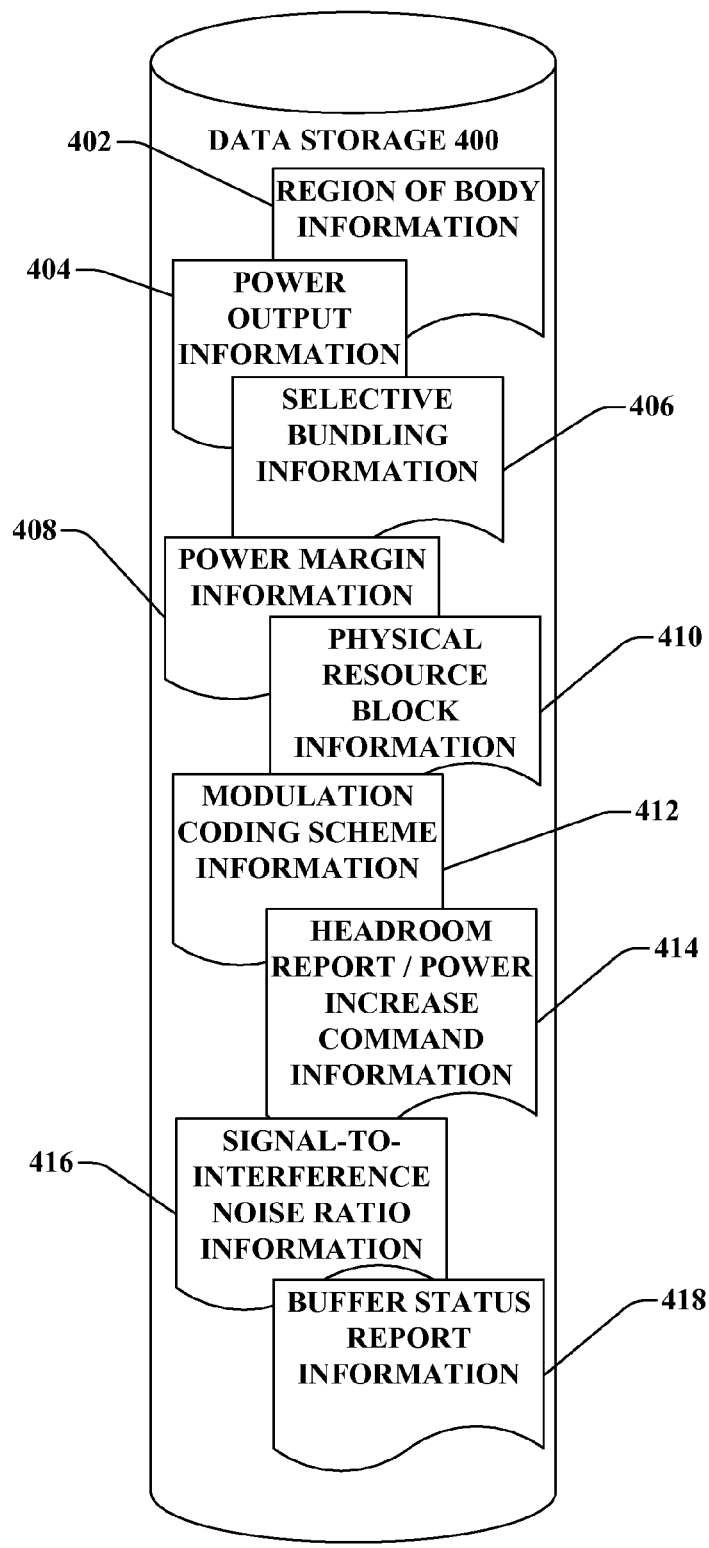
FIG. 4 illustrates an example diagram of a data storage that facilitates processing for adaptive traffic flow management by a power-limited mobile device in accordance with embodiments described herein.
Figure 5:
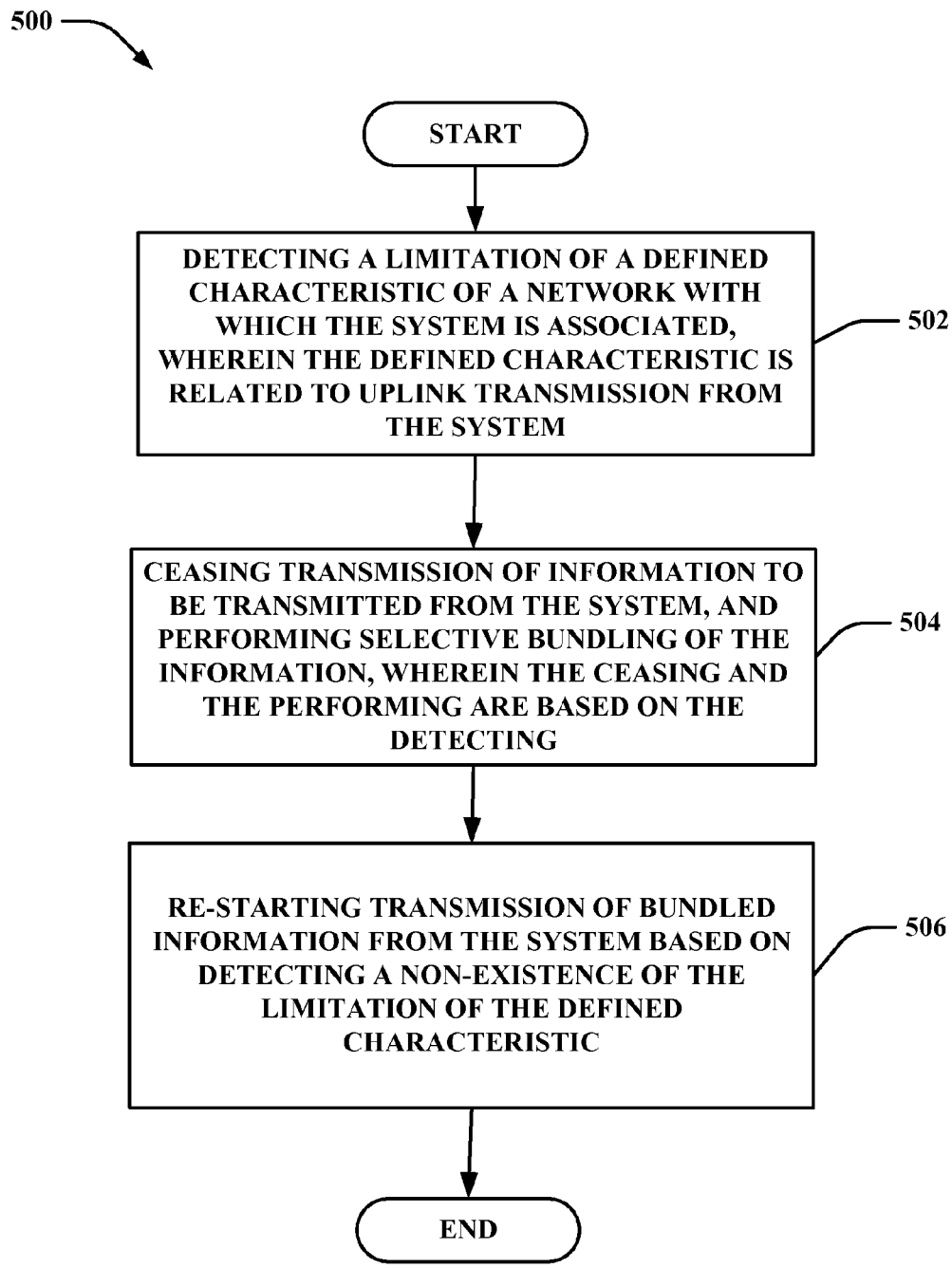
FIGS. 5-9 illustrate example flowcharts of methods that facilitate processing for adaptive traffic flow management by a power-limited mobile device in accordance with embodiments described herein.

FIG. 2 illustrates an example mobile device power attenuation table 200 of a mobile device 100 that can facilitate adaptive traffic flow management in accordance with embodiments described herein. FIG. 4 illustrates an example diagram of a data storage that facilitates processing for adaptive traffic flow management by a power-limited mobile device in accordance with embodiments described herein.

As shown in FIG. 2, the mobile phone power attenuation table 200 can include information indicative of one or more regions of a human body 202 to which the mobile device can be in proximity and a maximum output power 204 associated with the region of the body. As shown, different regions of the body are associated with different maximum output power levels from the mobile device 100.

The mobile phone power attenuation table 200 can be stored in the mobile device 100 and/or merely accessible by the mobile device 100 over a network (e.g., Internet). In some aspects, the information indicative of one or more regions of the human body and maximum output power information can be stored in data storage (e.g., data storage 400) of the mobile device. For example, the data storage 400 can store region of body information 402 and power output information 404.

For example, if the location detection component 104 determines that the mobile device 100 is not within a defined proximity to a human body, the power level component 106 can receive information indicative of such determination and control the mobile device 100 to emit full power. As another example, if the location detection component 104 determines that the mobile device 100 is within a defined proximity to the head, lap, extremities or trunk, the power level component 106 can receive information indicative of such determination and adjust the power emitted from the mobile device based on an attenuation table of values stored in and/or accessible by the mobile device. The particular value to which the power is adjusted can be a function of the particular body part with which the mobile device 100 is within the defined proximity.

With reference to FIGS. 1 and 2, the power component 106 can receive the signal from the location detection component 104 indicative of the region of the body within which the mobile device 100 is in proximity and/or access the power attenuation table 400 to determine whether to reduce, increase or allow the power emitted by the mobile device 100 to remain constant.

For example, if the attenuation table 400 indicates that the power allowed for the region of the body detected is less than the current power at which the mobile device 100 transmits, the power component 106 can reduce the power output from the mobile device 100 to the amount less than or equal to the maximum output power indicated in the attenuation table 400. If the attenuation table 400 indicates that the power allowed for the region of the body detected is greater than the current power at which the mobile device 100 transmits, the power component 106 can increase the power output from the mobile device 100 to the amount less than or equal to the maximum output power indicated in the attenuation table 400. If the attenuation table 400 indicates that the power allowed for the region of the body detected is approximately equal to the current power at which the mobile device 100 transmits, the power component 106 can allow the power output from the mobile device 100 to remain at the current output power value configured for the mobile device. In some embodiments, power levels can be approximately equal if the power levels are within a defined acceptable range of one another.

Turning back to FIG. 2, as a first example, if the location detection component 104 determines that the mobile device 100 is within a defined proximity to the head of the user of the mobile device 100, the power component can adjust the power emitted by the mobile device to be less than or equal to approximately 0.5 decibel (dB). As a second example, if the location detection component 104 determines that the mobile device 100 is within a defined proximity to the trunk of the user of the mobile device 100, the power component can adjust the power emitted by the mobile device to be less than or equal to approximately 3 dB. As a third example, if the location detection component 104 determines that the mobile device 100 is within a defined proximity to the lap of the user of the mobile device 100, the power component can adjust the power emitted by the mobile device to be less than or equal to approximately 1 dB.

After the power emitted from the mobile device 100 is reduced, the mobile device 100 is power-limited. The power-limited mobile device 100 can have an increased risk of transmitting signals that do not successfully reach the BS device if, for example, the mobile device 100 is located within a defined proximity to the edge of the cellular coverage area with which the mobile device 100 is associated. As such, in various embodiments, the power component 106 can determine that the level of the power emitted from the mobile device 100 is less than or approximately equal to a particular threshold value. The power component 106 can then transmit a signal to the adaptive traffic flow management component 108 including such information to facilitate adaptive traffic flow management operations by the mobile device 100.

The memory 110 can be a computer-readable storage medium storing computer-executable instructions and/or information for performing the functions described herein with reference to the mobile device 100. For example, the memory 110 can store computer-executable instructions for adjustment of power emitted from the mobile device 110, determination of a location of the body at which the mobile device 100 is located and/or evaluation of the network and/or application executed by the mobile device 100 to facilitate adaptive traffic flow management.

Processor 112 can perform one or more of the functions described herein with reference to the mobile device 100. For example, the processor 112 can facilitate determination of a location of the body at which the mobile device 100 is placed and/or adjustment of power emitted from the mobile device 100. As another example, in some embodiments, the processor 112 can facilitate execution of an application by the mobile device 100. The application can be a real-time application or a non-real-time application. Based on whether the application is a real-time application or a non-real-time application, the processor 112 can facilitate performance of selective bundling and/or initiating a process that will cause the mobile device 100 to be transferred to a new wireless communication system from the current wireless communication system.

The data storage 114 can be configured to store information transmitted to, received by and/or processed by the mobile device 100. In various embodiments, the data storage 114 can store information including, but not limited to, the information stored in data storage 300, mobile phone attenuation table 400, information indicative of one or more past or current levels of power emitted by the mobile device, network information, information associated with whether an application executed by the mobile device 100 is a real-time application or a non-real-time application and/or wireless communication system identifiers and information.

Figure 3:
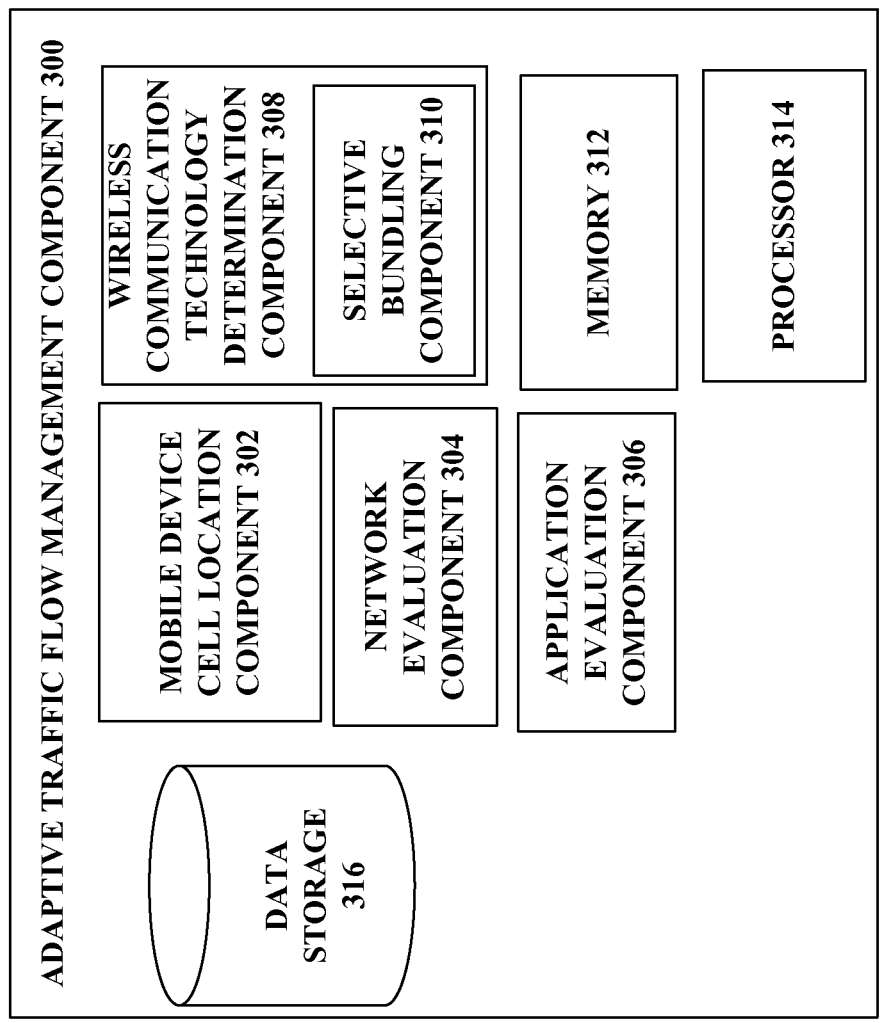
FIG. 3 illustrates an example block diagram of an adaptive traffic flow management component in accordance with embodiments described herein.

The adaptive traffic flow management component 108 will be described in greater detail with reference to FIGS. 1, 3 and 4. FIG. 3 illustrates an example adaptive traffic flow management component 300 in accordance with embodiments described herein. The adaptive traffic flow management component 108 can include one or more of the structure and/or functionality of the adaptive traffic flow management component 300 (and vice versa).

As shown in FIG. 3, the adaptive traffic flow management component 300 can include a network evaluation component 304, an application evaluation component 306, a mobile device cell location component 302, a wireless communication system determination component 308, a selective bundling component 310, a memory 312, a processor 314 and/or data storage 316. In some embodiments, one or more of the network evaluation component 304, application evaluation component 306, mobile device cell location component 302, wireless communication system determination component 308, selective bundling component 310, memory 312, processor 314 and/or data storage 316 can be electrically and/or communicatively coupled to one another to perform one or more functions of the adaptive traffic flow management component 300.

In various embodiments, the adaptive traffic flow management component 300 can employ selective bundling, adaptation from idle mode operation to active mode operation (and vice versa), evaluation of one or more characteristics of the network and applications being executed by the mobile device to adaptively and autonomously manage the uplink communications from the mobile device 100 and/or determine whether to cause the mobile device to transfer to a different wireless communication system.

Re-starting communication on a new wireless communication system can have limitations including, reduced resources in the new wireless communication system relative to the resources available in the current wireless communication system, the delay in communications resultant from the time required to re-start communication on the new wireless communication system and the like. As such, the adaptive traffic flow management component 300 can attempt to employ other approaches (e.g., selective bundling) while remaining on the current wireless communication system in certain embodiments.

As used herein, the term "selective bundling" can mean bundling together and temporarily storing at the mobile device information that would typically be transferred separately from the mobile device. For example, multiple packets that would typically be sent separately over time (e.g., packets typically sent in series over time) from the mobile device 100 can be selective bundled at the mobile device 100 such that the multiple packets are temporarily stored at the mobile device 100. Because LTE, for example, can support high bursts of data, after selective bundling has ended, when the mobile device 100 changes back to active mode operation and re-starts LTE, for example, the mobile device 100 can transmit a burst of bundled information, and the application being executed by the mobile device 100 can continue. This process can be conducted during a short time period such that the likelihood that the user experiences inconvenience from the interruption in service on the application being executed by the user is minimal or non-existent.

The adaptive traffic flow management component 300 can receive signal from the power component 106 indicating that the mobile device 100 has been configured to output a level of power for uplink transmissions that is less than a defined threshold.

Based on receipt of this signal, the mobile device cell location component 302 can determine the mobile device location within the cell. For example, the mobile device cell location component 302 can determine whether the mobile device 100 is within a defined proximity to the edge of the cell. In some embodiments, if the mobile device 100 is within the defined proximity to the edge of the cell, the adaptive traffic flow management component 300 can perform one or more steps to determine an whether to transfer the mobile device 100 to a new wireless communication system from the current wireless communication system and/or to remain associated with the current wireless communication system and perform selective bundling of information from the mobile device 100.

In some embodiments, upon receiving a signal indicating that the mobile device 100 has been configured to output a level of power for uplink transmissions that is less than a defined threshold, the adaptive traffic flow management component 300 can perform one or more steps to determine an whether to transfer the mobile device 100 to a new wireless communication system from the current wireless communication system and/or to remain associated with the current wireless communication system and perform selective bundling of information from the mobile device 100. In this embodiment, these steps can be performed irrespective of whether the mobile device is within the defined proximity to the edge of the cell.

In either embodiment, the network evaluation component 304 can evaluate the network with which the mobile device 100 is associated. In some embodiments, the network evaluation component 304 can evaluate the network to determine whether one or more uplink limitations exist. The uplink limitations can be related to any number of different factors including, but not limited to, the BS device SINR, physical resource block (PRB) allocation, modulation coding scheme (MCS), power information as indicated by the power headroom and the like. In various embodiments, information associated with power margins and power headroom reports, information associated with the use of the channel quality indicator (CQI) to determine which MCS is more robust and the like are well-known and can be defined, described and/or detailed per the methods described in the 3GPP LTE Release 8 and beyond standard.

The network evaluation component 304 can perform slink adaptation of various radio link characteristics while the mobile device 100 is actively uploading information to the BS device. However, when the mobile device 100 has low power, the uplink signaling path can be broken. When the uplink signaling path is broken, link adaptation can become unstable and the uplink can be prone to dropped calls. To address these issues, the mobile device can monitor uplink link adaptation signaling in order to perform adaptive traffic flow management by proactively identifying breaks in the uplink signaling path.

The network evaluation component 304 can perform network evaluation of the PRB allocation (e.g., frequency allocation), MCS and power to determine whether an uplink-limited condition exists. In particular, BS device uplink Signal-to-Interference Noise Ratio (SINR), which is an indicator of the uplink signal quality experienced by the BS device, mobile device power headroom reports and/or mobile device uplink buffer status reporting can be evaluated and/or employed.

With regard to power, the network evaluation component 304 can perform network evaluation to determine whether an uplink-limited condition exists. In particular, from time to time, the mobile device 100 can report uplink power headroom to the BS device. In the proximity case in which the mobile device is within a particular proximity to a region of the human body, the power of the mobile device 100 is limited and the mobile device power headroom reports will be reduced (relative to embodiments in which the mobile device 100 is not within a defined proximity to the human body).

As the mobile device 100 nears the edge of the cell, the BS device can request power increases until the power headroom for the mobile device 100 reaches 0 dB. When the power headroom reaches 0 dB, the BS device typically ceases to transmit power increase commands. However, if power increase commands from the BS device do not cease after the mobile device has reached full allowed power, the network evaluation component 304 can determine that the BS device is not receiving uplink power headroom reports from the mobile device 100 and therefore the uplink signaling path is broken, in particular, and/or an uplink-limited condition exists, in general.

With regard to PRB allocation, the network evaluation component 304 can detect low PRB allocation as follows. As the mobile device nears the edge of the cell, the BS device can attempt to maximize the uplink SINR of the BS device by concentrating all (or, in some embodiments, at least a majority portion) of the mobile device power to a limited set of PRB. If the uplink PRB allocation for the mobile device 100 is a minimum PRB value (e.g., 1 PRB) for a defined amount of time, the network evaluation component 304 can determine that the BS device uplink SINR is poor and the mobile device 100 has reached the uplink limit for the mobile device 100.

With regard to MCS allocation, the network evaluation component 304 can detect low MCS allocation as follows. As the mobile device nears the edge of the cell, the BS device can attempt to maximize the uplink block error rate (BLER) by reducing the MCS to more robust MCSs. For example, quadrature phase-shift keying (QPSK) is more robust than 64 quadrature amplitude modulation (QAM). If the mobile device 100 is at maximum allowed power and the uplink MCS is QPSK for an extended length of time, the network evaluation component 304 can determine that the BS device uplink SINR is poor and the uplink limit for the mobile device 100 has been reached.

With reference to the data storage 400 shown in FIG. 4, the power margin information 408, PRB information 410, MCS information 412, headroom report/power increase command information 414, SINR information 416 and/or buffer status report information 418 can be stored in the data storage 400 at the mobile device. In some embodiments, the information can be stored at a data storage accessible by the mobile device over a network (e.g., over the Internet).

The network evaluation component 304 can generate information indicating the uplink limitation for the mobile device 100 when such condition is detected. The network evaluation component 304 can also generate information indicative of the downlink reference signal received power (RSRP) to a scheduler within the selective bundling component 310.

In response to the signals generated by the network evaluation component 302, the application evaluation component 306 can evaluate the application being currently executed by the mobile device 100. For example, in some embodiments, the application evaluation component 306 can determine whether the application currently executed by the mobile device 100 is a real-time application or a non-real-time application.

The wireless communication system determination (WCTD) component 308 can determine whether to cause the mobile device 100 to be transferred from a first wireless communication system to a second wireless communication system based on the evaluations performed by the network evaluation component 302 and/or the application evaluation component 306.

In various embodiments, the WCTD component 308 can determine to transmit information to cause the mobile device to be transferred to the second wireless communication system (or can determine to not transmit such information) based on any number or combination of different factors including, but not limited to, the evaluation of whether the application is a real-time application, the current network condition, anticipated future network condition, the power level of the mobile device and/or the location of the mobile device within the cell.

In some embodiments, if the mobile device is executing a non-real-time application and/or the network conditions have an acceptable likelihood of improving within an acceptable defined amount of time, the WCTD component 308 can generate a signal to cause the selective bundling component 310 to begin selective bundling the information to be transmitted from the mobile device 100. The WCTD component 308 can also determine to not transmit information that will cause the mobile device 100 to be transferred to a new wireless communication system.

While the selective bundling component 310 is performing the selective bundling, the mobile device 100 does not transmit data to the network.

In some embodiments, the selective bundling component 310 can discontinue data flows by manipulating the uplink buffer status report transmitted to the BS device. If the uplink buffer status report includes information indicative of an empty buffer to the BS device, the BS device will not grant uplink resources for the mobile device 100.

In some embodiments, however, after a defined amount of time of performing selective bundling, and therefore not transmitting information, in some embodiments, the mobile device 100 can receive a signal from the network causing the mobile device 100 to update operation to idle mode operation. For example, the mobile device 100 can update operation to idle mode operation after the mobile device 100 fails to transmit information for approximately 10 to 15 seconds.

In lieu of transferring to a new wireless communication system that may have better performance given the reduced power of the mobile device 100, the mobile device 100 can wait in idle mode on the current wireless communication system and the selective bundling component 310 can bundle the application information at the mobile device 100 until network conditions in the current wireless communication system improve.

The selective bundling component 310 can selectively bundle information (e.g., selectively bundle packets) while the network evaluation component 302 continue to monitor the uplink network conditions for improvement and recovery (and/or until the application evaluation component 306 indicates that a real-time application is now being executed by the mobile device 100). For example, the selective bundling component 310 can selectively bundle application information in lieu of transmitting the information from the mobile device 100, and the network evaluation component 304 can continue to monitor the network conditions.

If the network fails to improve within the acceptable defined amount of time (or if the likelihood that the network would improve within the acceptable defined amount of time was less than a particular value during the initial evaluation of the network), the mobile device 100 can transmit information (e.g., signal strength report information that includes information about the mobile device power limits). The network can then transfer the mobile device 100 from the current wireless communication system to a new wireless communication system.

In particular, in some aspects, upon determination that an uplink-limited condition exists, the mobile device 100 can discontinue transmission of data (e.g., application information) from the mobile device 100. The BS device can recognize this inactivity from the mobile device 100 and after approximately 10-15 seconds of inactivity, release radio bearers so the mobile device can return to idle mode.

While the mobile device is in idle mode, the mobile device can perform evaluations to determine the time to re-start transmissions of data from the mobile device 100. In some aspects, while in idle mode, the mobile device 100 can scan other neighboring communication technologies.

If another wireless communication system is found to be better than the current wireless communication system in one or more of the radio link conditions evaluated by the network evaluation component (e.g., by the amount of power reduction), the mobile device can re-select the new wireless communication system and re-start the data transmission by reporting actual buffer status on the new wireless communication system.

If no better wireless communication system is found, the mobile device 100 can wait in idle mode on the current wireless communication system until the downlink RSRP for the wireless communication system improves. The previous downlink RSRP at which the uplink-limited condition was detected can be the reference RSRP. If the downlink RSRP for the wireless communication system improves above the reference RSRP, the mobile device 100 can attempt to re-start the data transmission by reporting actual buffer status on the same wireless communication system on which the mobile device 100 was associated.

Otherwise, in some aspects (if the downlink RSRP has not improved above the reference RSRP), the mobile device can wait in the idle mode until one or more conditions occur. For example, the mobile device can wait in idle mode until the mobile device 100 is no longer within the area that is a defined proximity to the edge of the cellular coverage area and the maximum power allowed for the power output changes. As another example, example, the mobile device can wait in idle mode until the neighbor or serving signal conditions improve. In either case, the mobile device is able to soften the impact of the uplink limited condition while reducing the occurrence of dropped calls (relative to taking no action and continuing to transmit in the active mode any application information irrespective of the power limitations of the mobile device 100 and/or irrespective of the network conditions).

If the application being executed is a real-time application, WCTD can transmit information to the network to cause the network to initiate a transfer of the mobile device 100 from the current wireless communication system to a new wireless communication system. For example, if the mobile device 100 is communicating on an LTE system, the network can initiate a transfer of the mobile device to a UMTS system.

For example, in some embodiments, the WCTD component 308 can cause the mobile device 100 to be transferred by sending information to the network indicating the reduced power of the mobile device 100. When the power is reduced to a particular defined level, the network may respond by initiating a process to move the mobile device 100 from a first wireless communication system to a second wireless communication system.

While the UMTS system may have fewer resources than the LTE system generally, in these embodiments in which the application is a real-time application, the reduced resources in UMTS may be preferable for maintaining performance of the application relative to the performance that may be reduced in power-limited conditions.

During uplink-limited conditions, active data calls and flows can drop while idle data calls and flows wait but do not drop. This is a key principle for this application. For transmission control protocol applications, downlink data flows are dependent upon uplink acknowledge feedback from the mobile device towards the server. If the uplink path is broken, the transmission control protocol feedback is not received and downlink data will not flow, even if the downlink path is reliable. In this case the mobile device and BS device can be busy with unnecessary transmission control protocol chatter, yet providing no useful data flow from the application perspective. While in this mode, the signaling path for active mode mobility, including mobile device measurement reports required for release and re-direct from the BS, are also broken. Lacking a good signaling path for active mode mobility, the radio link can fail and result in a dropped call.

If the uplink conditions are known to be impaired, it is therefore preferable to discontinue the data flow and allow the mobile device to temporarily return to idle. In idle mode the mobile device can perform autonomous reselection towards another wireless communication technology (if available) and is not dependent upon the uplink signaling path for measurement reports to the BS device. Also while idle the mobile device can monitor radio conditions and re-start data flows when the uplink-limited condition clears.

FIGS. 5-9 illustrate example flowcharts of methods that facilitate processing for adaptive traffic flow management by a power-limited mobile device in accordance with embodiments described herein. At 502, method 500 can include detecting a limitation of a defined characteristic of a network with which the system is associated, wherein the defined characteristic is related to uplink transmission from the system. By way of example, but not limitation, the limitation can include a network condition impairing the uplink from the mobile device. The defined characteristic can include, but is not limited to, mobile device power, physical resource block (PRB) allocation (e.g., frequency allocation), modulation coding scheme (MCS), BS device uplink Signal-to-Interference Noise ratio, mobile device power headroom reports and/or mobile device uplink buffer status reporting. In some embodiments, the limitation can be triggered due to a reduced level of power output from the mobile device. The level of power output can be such that the BS device to which the mobile device is assigned is unable to receive transmissions from the mobile device reliably.

At 504, method 500 can include ceasing transmission of information to be transmitted from the system, and performing selective bundling of the information based on the detecting. In some embodiments, although not shown, the method 500 can also include determining that an application being executed by the system is a non-real-time application, wherein the ceasing transmission and the performing the selective bundling are in response to the determining.

At 506, method 500 can include re-starting transmission of bundled information from the system based on detecting a non-existence of the limitation of the defined characteristic of the network.

Figure 6:
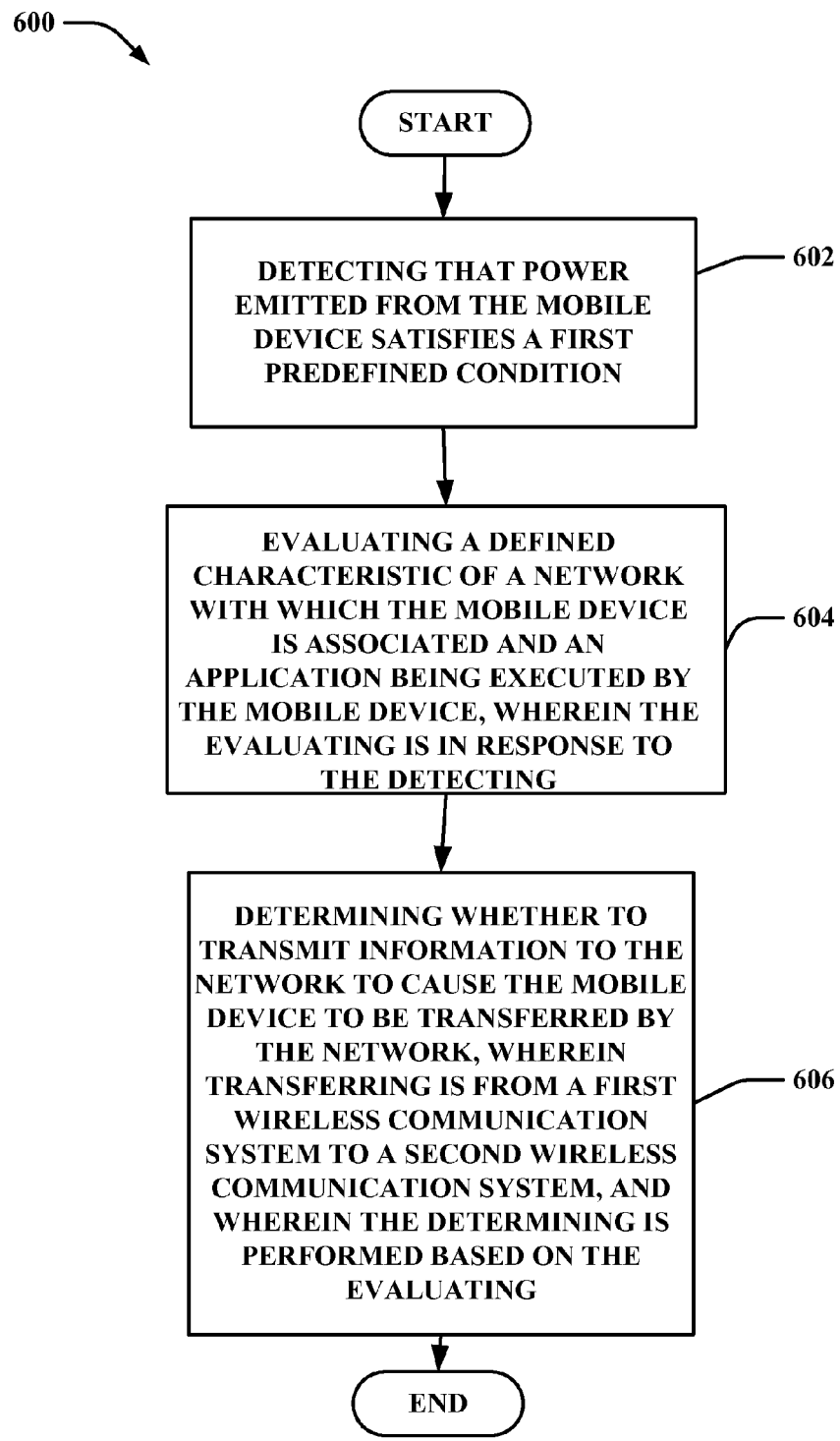

Turning now to FIG. 6, at 602, method 600 can include detecting that power emitted from the mobile device satisfies a first defined condition. In some embodiments, although also not shown, the method can include determining a location of the mobile device relative to a region of a human body within a defined proximity to the mobile device. For example, whether the mobile device is within a certain proximity to the body of a human can be determined. If so, the determination can be made as to which region of the human body the mobile device located near. The power emitted from the mobile device can be reduced or otherwise increased or remain constant based on the region of the body that the mobile device is near. As such, the detected power level in step 602 can be a result of reducing, increasing or remaining at a constant level as dictated by the region of the body that the mobile device is near.

At 604, method 600 can include evaluating a defined characteristic of a network with which the mobile device is associated and an application being executed by the mobile device, wherein the evaluating is in response to the detecting. In some embodiments, whether the location of the mobile device is within a defined proximity to an edge of a cellular coverage area to which the mobile device is assigned can be determined. The detection that the mobile device is near the edge of the cell, for example, can be a factor causing the evaluation of the network and/or application in some embodiments.

For example, in some embodiments, a determination can be made as to whether the application being executed is a non-real-time application and/or whether a characteristic of the network satisfies a second defined condition.

At 606, method 600 can include determining whether to transmit information to the network to cause the mobile device to be transferred by the network, wherein transferring is from a first wireless communication system to a second wireless communication system, and wherein the determining is performed based on the evaluating. In some embodiments, the first wireless communication system can be associated with a Long-Term Evolution system and the second wireless communication system can be associated with UMTS. In other embodiments, the first and second technology layers can be any number of different systems on which the mobile device is configured to communicate.

In some embodiments, a determination can be made to not transmit information to cause the mobile device to be transferred from the first wireless communication system to the second wireless communication system based on determining that the application being executed is a non-real-time application.

In some embodiments, a determination can be made to transmit information to cause the mobile device to be transferred from the first wireless communication system to the second wireless communication system based on determining that the application being executed is a real-time application and/or based on the characteristic of the network not meeting a defined condition.

The information that the mobile device can transmit to cause the mobile device to be transferred can include information indicative of the power emitted from the mobile device being less than a particular value and/or information indicative of the value of the power emitted from the mobile device.

Figure 7:
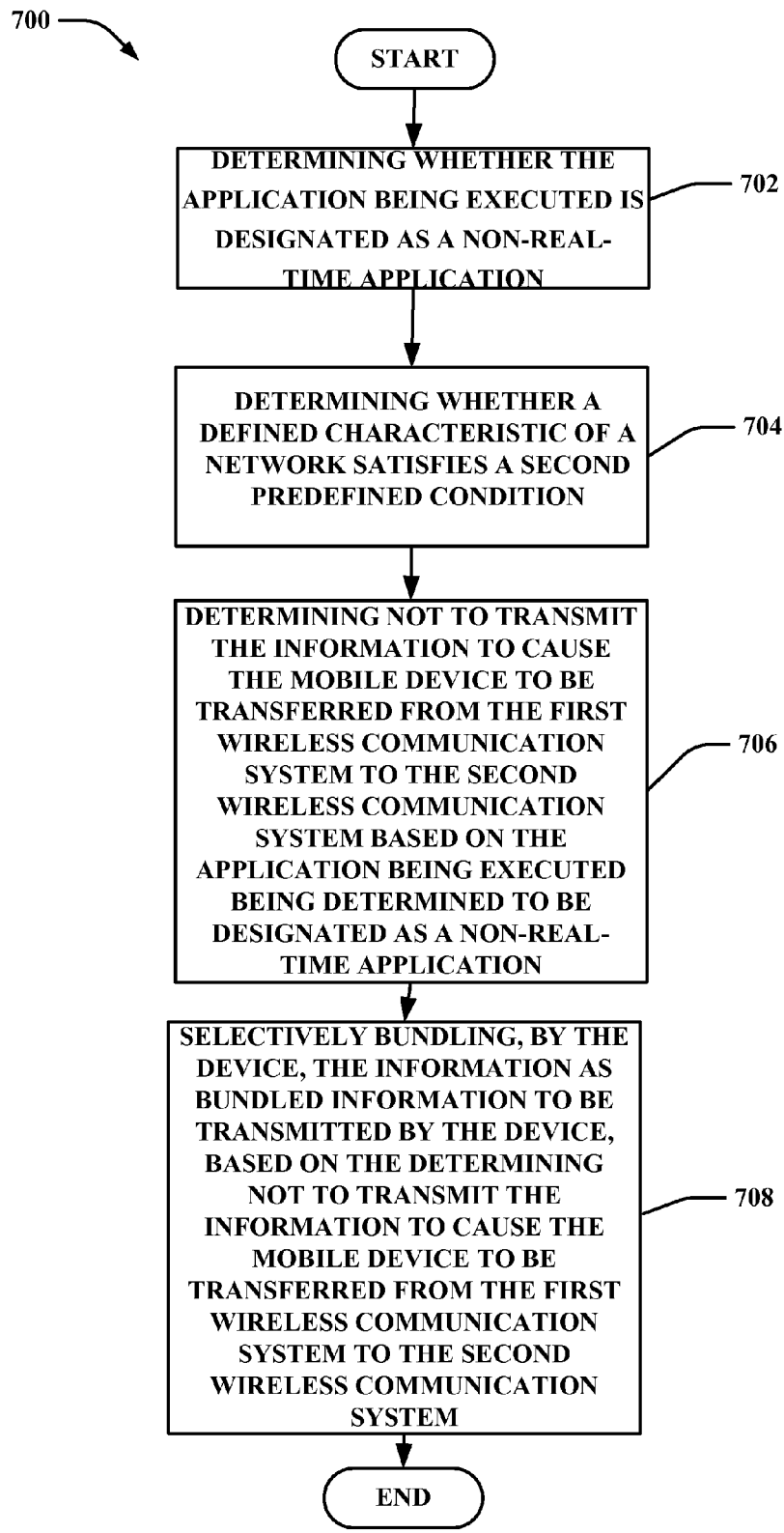

Turning now to FIG. 7, at 702, method 700 can include determining whether the application being executed is designated as a non-real-time application. At 704, method 700 can include determining whether a defined characteristic of the network satisfies a defined condition.

At 706, method 700 can include determining not to transmit the information to cause the mobile device to be transferred from the first wireless communication system to the second wireless communication system based on the application being executed being determined to be designated as a non-real-time application.

At 708, method 700 can include selectively bundling, by the device, the information as bundled information to be transmitted by the device, based on the determining not to transmit the information to cause the mobile device to be transferred from the first wireless communication system to the second wireless communication system. In some embodiments, the mobile device can change to idle mode after the selectively bundling is commenced.

Figure 8:
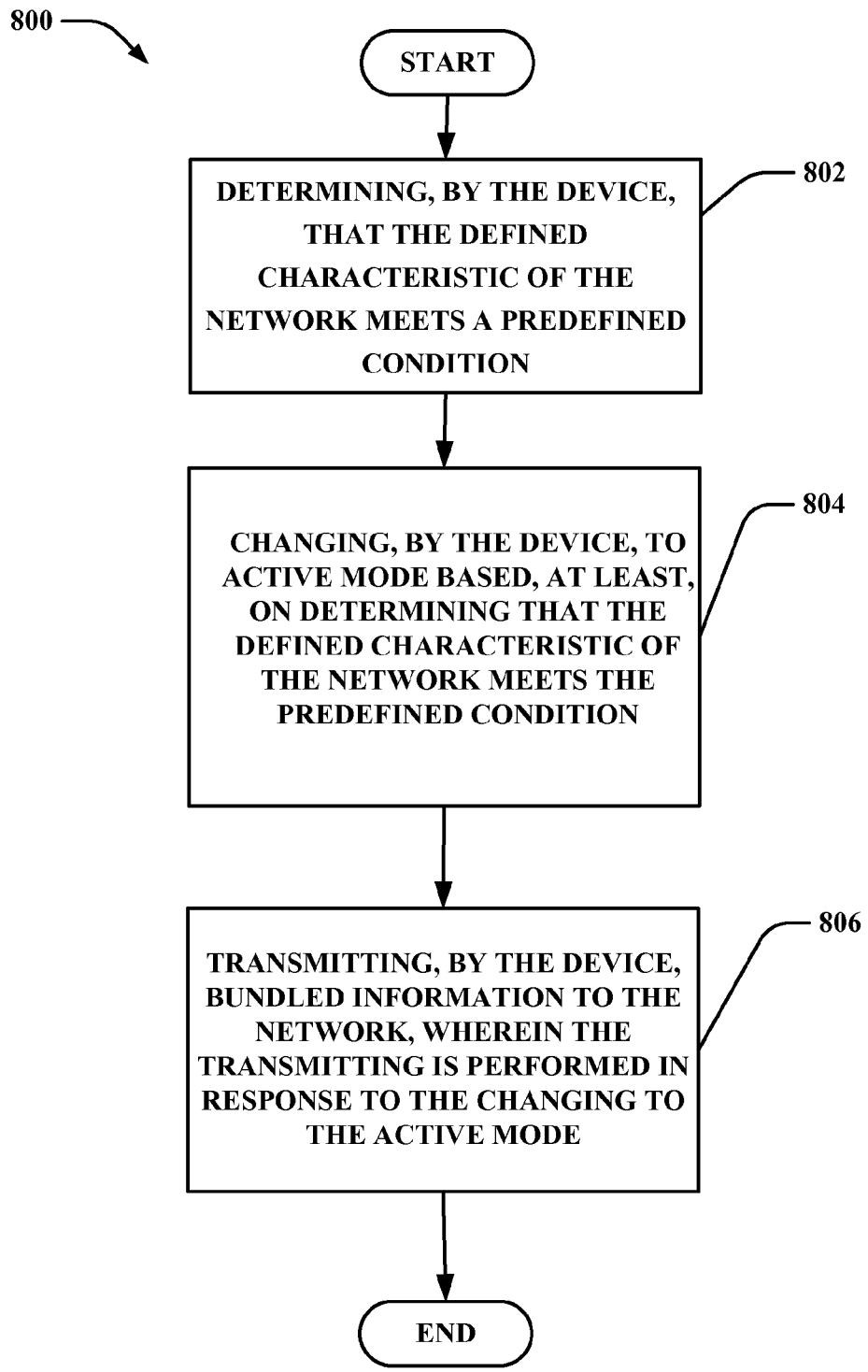

Turning now to FIG. 8, at 802, method 800 can include determining, by the mobile device, that the defined characteristic of the network meets a defined condition.

At 804, method 800 can include changing, by the mobile device, to active mode based on determining that the defined characteristic of the network meets the defined condition. At 806, method 800 can include transmitting, by the mobile device, bundled information to the network, wherein the transmitting is performed in response to the changing to the active mode.

Figure 9:
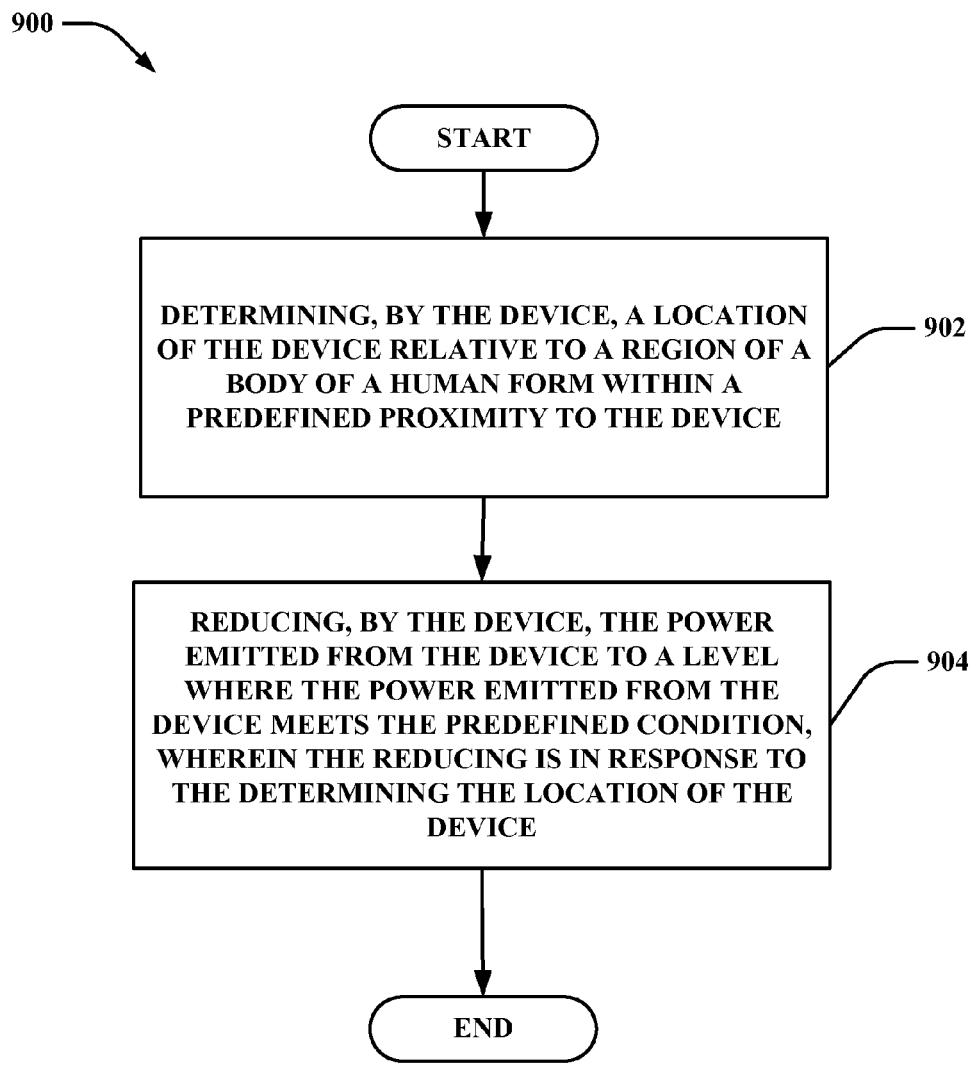

Turning now to FIG. 9, at 902, method 900 can include determining, by the device, a location of the device relative to a region of a body of a human form within a predefined proximity to the device.

At 904, method 900 can include reducing, by the device, the power emitted from the device to a level where the power emitted from the device meets the predefined condition, wherein the reducing is in response to the determining the location of the device. In some embodiments, the reducing is in response to the determination of the location of the mobile device.

Figure 10:
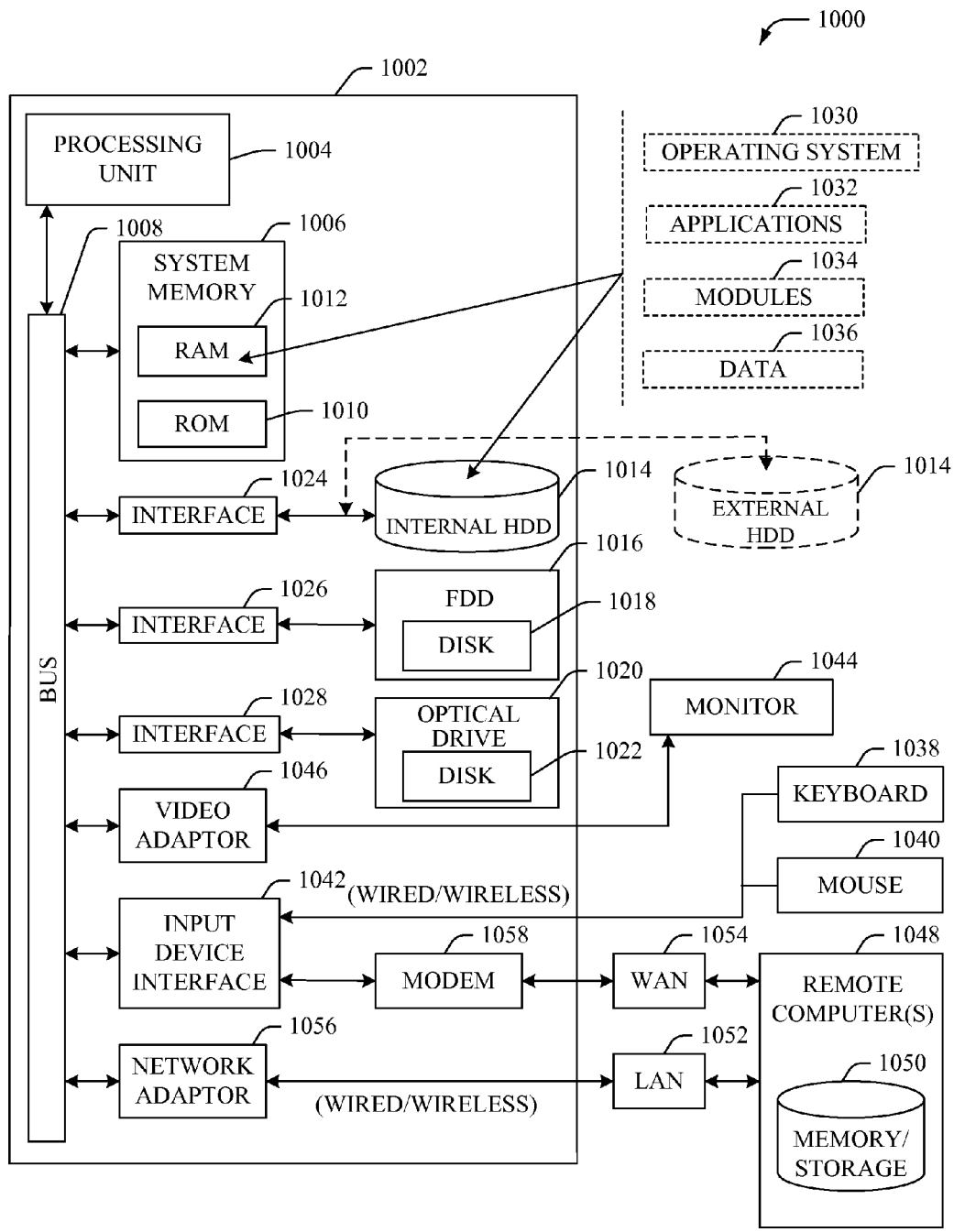
FIG. 10 illustrates a block diagram of a computer operable to facilitate processing for adaptive traffic flow management by a power-limited mobile device in accordance with embodiments described herein.

Referring now to FIG. 10, there is illustrated a block diagram of a computer operable to facilitate adaptive traffic flow management. For example, in some embodiments, the computer can be or be included within the mobile device 100 and/or adaptive traffic flow management component 108, 200.

In order to provide additional context for various embodiments of the embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive 1014, which internal hard disk drive 1014 can also be configured for external use in a suitable chassis (not shown), a magnetic floppy disk drive 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A mobile device can enter commands and information into the computer 1002 through one or more wired/wireless input devices, e.g., a keyboard 1038 and a pointing device, such as a mouse 1040. Other input devices (not shown) can include a microphone, an infrared remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a USB port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a sector carrier phone that enables such devices, e.g., computers, to send and receive data indoors and out; anywhere within the range of a BS device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The embodiments described herein can employ artificial intelligence (AI) to facilitate automating one or more features described herein. The embodiments (e.g., in connection with automatically identifying acquired sector carrier sites that provide a maximum value/benefit after addition to an existing communication network) can employ various AI-based schemes for carrying out various embodiments thereof. Moreover, the classifier can be employed to determine a ranking or priority of the each sector carrier site of the acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired sector carrier sites will benefit a maximum number of subscribers and/or which of the acquired sector carrier sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor, a field programmable gate array, a programmable logic controller, a complex programmable logic device, a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM, synchronous dynamic RAM, double data rate synchronous dynamic RAM, enhanced synchronous dynamic RAM, synchlink dynamic RAM, and direct rambus RAM. The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    determining, by a device comprising a processor, whether to transmit information to a network device of a network with which the device is associated to cause the device to be transferred from a first wireless communication system to a second wireless communication system; and
    responsive to a result of the determining, reducing, by the device, power emitted from the device to a power level at which a reduced power emitted from the device is determined to satisfy a first condition, wherein the reducing is based on a location of the device determined relative to a region of regions of a body of a user, and wherein the region is determined based on a signal value of the device of signal values using a data structure that maps the regions of the body to the signal values.

2. The method of claim 1, further comprising:
    detecting, by the device, that the location of the device is within a defined proximity to an edge device associated with a cell device with which the device is associated.

3. The method of claim 1, further comprising:
    determining, by the device, the location of the device relative to the region of the regions of the body.

4. The method of claim 1, further comprising:
    determining, by the device, whether an application being executed by the device is designated as an application of a first type, and determining, by the device, whether a characteristic of the network satisfies a second condition.

5. The method of claim 4, wherein the determining whether to transmit the information to cause the device to be transferred from the first wireless communication system to the second wireless communication system comprises:
    determining not to transmit the information to cause the device to be transferred from the first wireless communication system to the second wireless communication system based on the application being executed being determined to be designated as the application of the first type.

6. The method of claim 5, further comprising:
    selectively bundling, by the device, the information as bundled information to be transmitted by the device, based on the determining not to transmit the information; and
    updating, by the device, an operation to an idle mode operation based on the selectively bundling.

7. The method of claim 6, wherein the determining whether the characteristic of the network satisfies the second condition comprises determining that the characteristic of the network satisfies the second condition, and further comprising:
    changing, by the device, the operation to an active mode operation based on the characteristic of the network being determined to satisfy the second condition; and
    transmitting, by the device, the bundled information to the network.

8. The method of claim 4, wherein the determining whether to transmit the information to cause the device to be transferred from the first wireless communication system to the second wireless communication system comprises:
    determining to transmit the information to cause the device to be transferred from the first wireless communication system to the second wireless communication system based on determining that the application being executed is a real-time application.

9. The method of claim 8, wherein the information comprises indicator information indicating that the power emitted from the device satisfies the first condition, and further comprising:
    transmitting, by the device to the network device, the indicator information indicating that the power emitted from the device satisfies the first condition, wherein the transmitting is in response to the determining to transmit the information to cause the device to be transferred from the first wireless communication system to the second wireless communication system.

10. The method of claim 4, wherein the determining whether to transmit the information to cause the device to be transferred from the first wireless communication system to the second wireless communication system comprises:
    determining to transmit the information to cause the device to be transferred from the first wireless communication system to the second wireless communication system based on determining that the characteristic of the network fails to satisfy the second condition.

11. The method of claim 10, further comprising:
    transmitting, by the device to the network, indicator information indicating that the power emitted from the device is less than the first condition, wherein the transmitting is in response to the determining to transmit the information to cause the device to be transferred from the first wireless communication system to the second wireless communication system.

12. The method of claim 1, wherein the second wireless communication system communicates according to a universal mobile telecommunications system protocol.

13. The method of claim 1, wherein the first wireless communication system communicates according to a long term evolution system protocol.

14. The method of claim 1, wherein the determining whether to transmit the information to cause the device to be transferred from the first wireless communication system to the second wireless communication system comprises determining to transmit the information to cause the device to be transferred as to be facilitated by the network device from the first wireless communication system to the second wireless communication system.

15. A system, comprising:
    a processor; and
    a memory that stores executable instructions that, when executed by the processor, facilitate performance of operations, comprising:
        determining to forego for a defined amount of time performing an action to cause the system to be transferred from a first wireless communication system to a second wireless communication system based on a defined characteristic of network devices of a network and a defined characteristic of an application being executed by the system being determined to satisfy a first defined condition;

performing selective bundling of information to be transmitted from the system;

determining a region of regions of a body that is using the system based on a signal value, of possible signal values, associated with the system comprising determining the region from a data structure that maps the possible signal values to the regions of the body; and responsive to the selective bundling, reducing a power emitted by the system, resulting in a reduced power less than the power, based on detecting a location of the system relative to the region of the body determined to be using the system.

16. The system of claim 15, wherein the operations further comprise:
detecting the location of the system relative to the region of the body determined to be using the system.

17. The system of claim 15, wherein the operations further comprise:
changing a mode of operation of the system to idle mode in response to the performing the selective bundling.

18. The system of claim 15, wherein the defined characteristic of the network comprises information indicative of whether an uplink from the system satisfies a second defined condition.

19. A computer-readable storage device storing executable instructions that, in response to execution, cause a system comprising a processor to perform operations, comprising:
after a determination of whether to transmit information to a network device of a network, adjusting a power emitted from the system to an adjusted power determined to satisfy a first condition, wherein the adjusting is based on a location of the system, carried on a body of a user, relative to a region of the body of the user associated with an identity determined to have interacted with the system, and wherein the region of the body is determined to have interacted with the system based on a signal value of the system and using a data structure that maps signal values of the system, comprising the signal value, to regions of the body, comprising the region; and evaluating a characteristic of network devices of a network with which the system is associated and an application being executed by the system.

20. The computer-readable storage device of claim 19, wherein the evaluating further comprises:
determining to forego transmission of information to cause the system to be transferred from a first wireless communication system to a second wireless communication system based on determining that the application being executed is designated as a type of application having a lower priority than a priority of another type of application.

* * * * *